United States Patent [19]

Livingston

[11] Patent Number: 5,322,102
[45] Date of Patent: Jun. 21, 1994

[54] PRUNING APPARATUS HAVING A HELICAL CUTTING HEAD

[76] Inventor: Edward G. Livingston, P.O. Box 67, Bly, Oreg. 97622

[21] Appl. No.: 109,621

[22] Filed: Aug. 20, 1993

[51] Int. Cl.⁵ .................. A01G 23/02; B27L 1/00; B27B 33/14
[52] U.S. Cl. ....................... 144/27; 30/383; 83/830; 144/208.5; 144/343
[58] Field of Search ............ 144/2.7, 3 D, 208 J, 144/343; 30/383; 83/830, 831, 832, 833, 834

[56] References Cited

U.S. PATENT DOCUMENTS

| | | | |
|---|---|---|---|
| 2,948,311 | 10/1958 | McCollum | 144/2.7 |
| 2,989,097 | 7/1961 | Bombardier | 144/2.7 |
| 3,565,143 | 2/1971 | Wehr | 144/208 J |
| 3,945,288 | 3/1976 | Olmr | 144/2.7 |
| 3,967,663 | 7/1976 | Loigerot | 144/2.7 |
| 4,049,032 | 9/1977 | Oldenburg et al. | 144/2.7 |
| 4,218,820 | 8/1980 | Cleva | 144/2.7 |
| 4,619,172 | 10/1986 | Perez | 144/2.7 |
| 4,781,228 | 11/1988 | Vaders | 144/2.7 |

FOREIGN PATENT DOCUMENTS 1300660 8/1969 Fed. Rep. of Germany ... 144/208 J
3702760 1/1987 Fed. Rep. of Germany .

*Primary Examiner*—W. Donald Bray
*Attorney, Agent, or Firm*—Chernoff, Vilhauer

[57] ABSTRACT

A pruning device having a chain saw with a flexible chainbar and a double-articulated cutting chain. The chainbar has a relaxed shape of a helix for encircling a tree trunk. The double-articulated cutting chain can curve about two lateral axes so that it may follow the perimeter of the helical chainbar and cut branches from the tree. A remotely located power supply is provided on a wheeled cart for powering the chain saw and supporting and operating a support wand that supports the chain saw and raises and lowers it along the tree trunk.

17 Claims, 5 Drawing Sheets

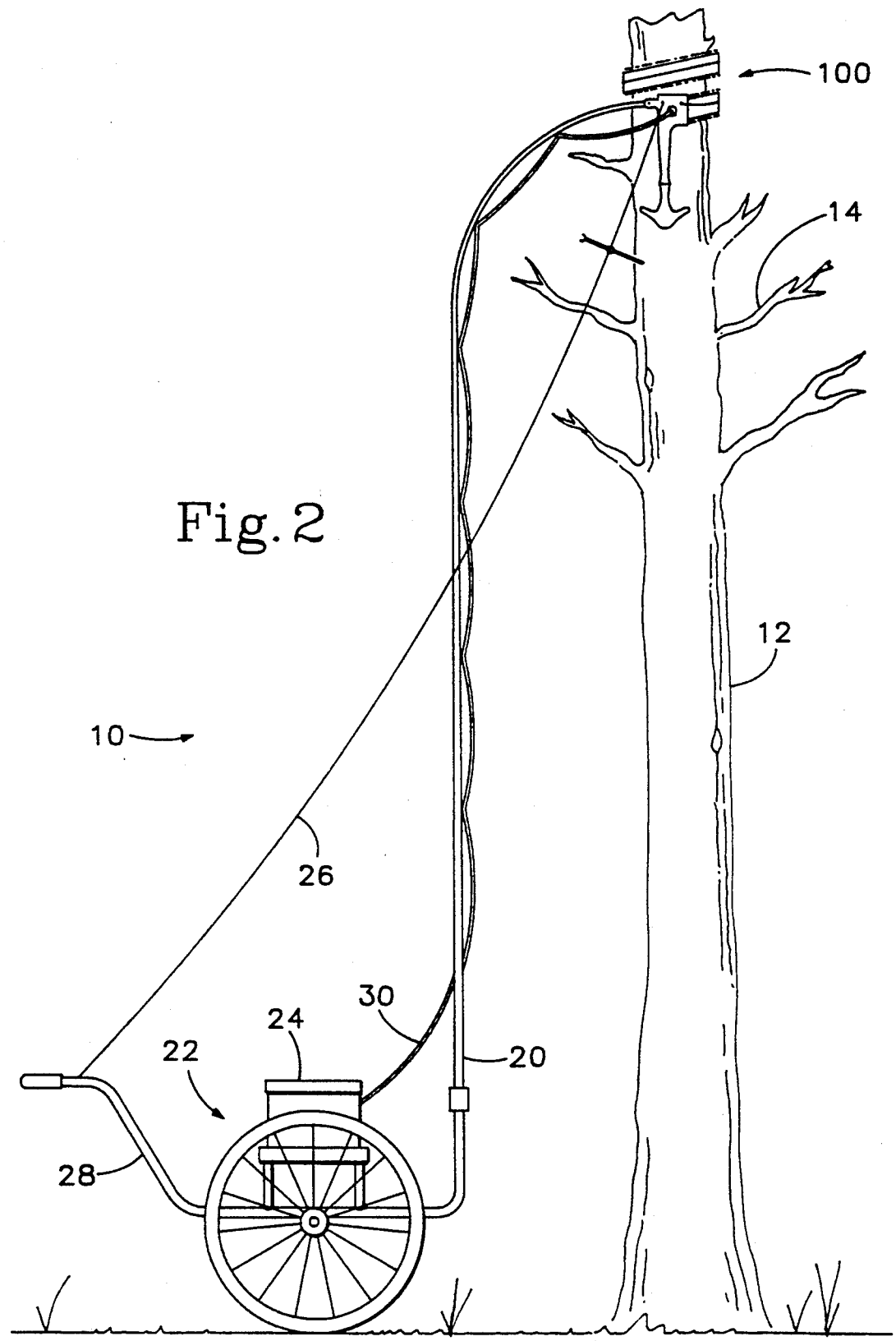

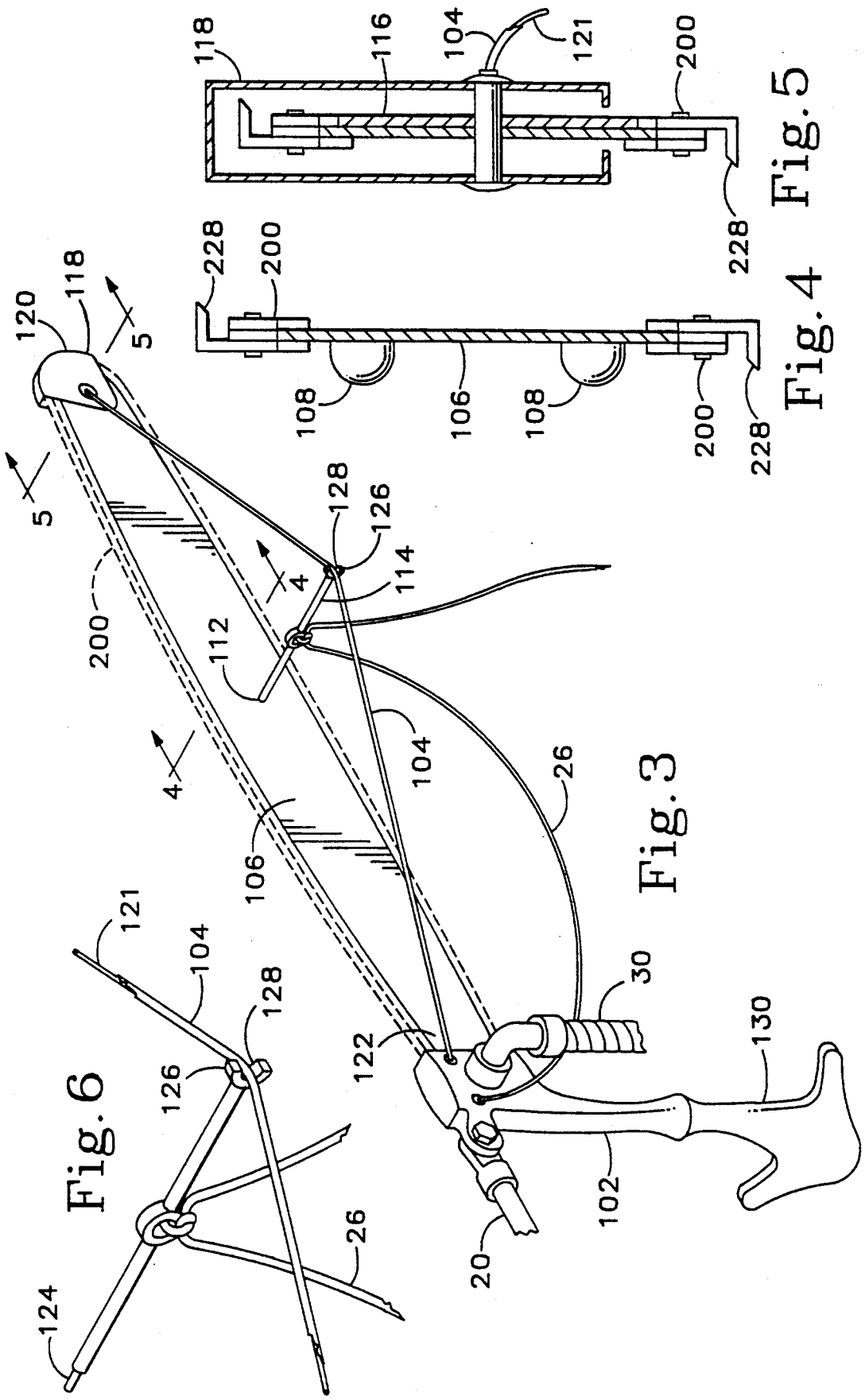

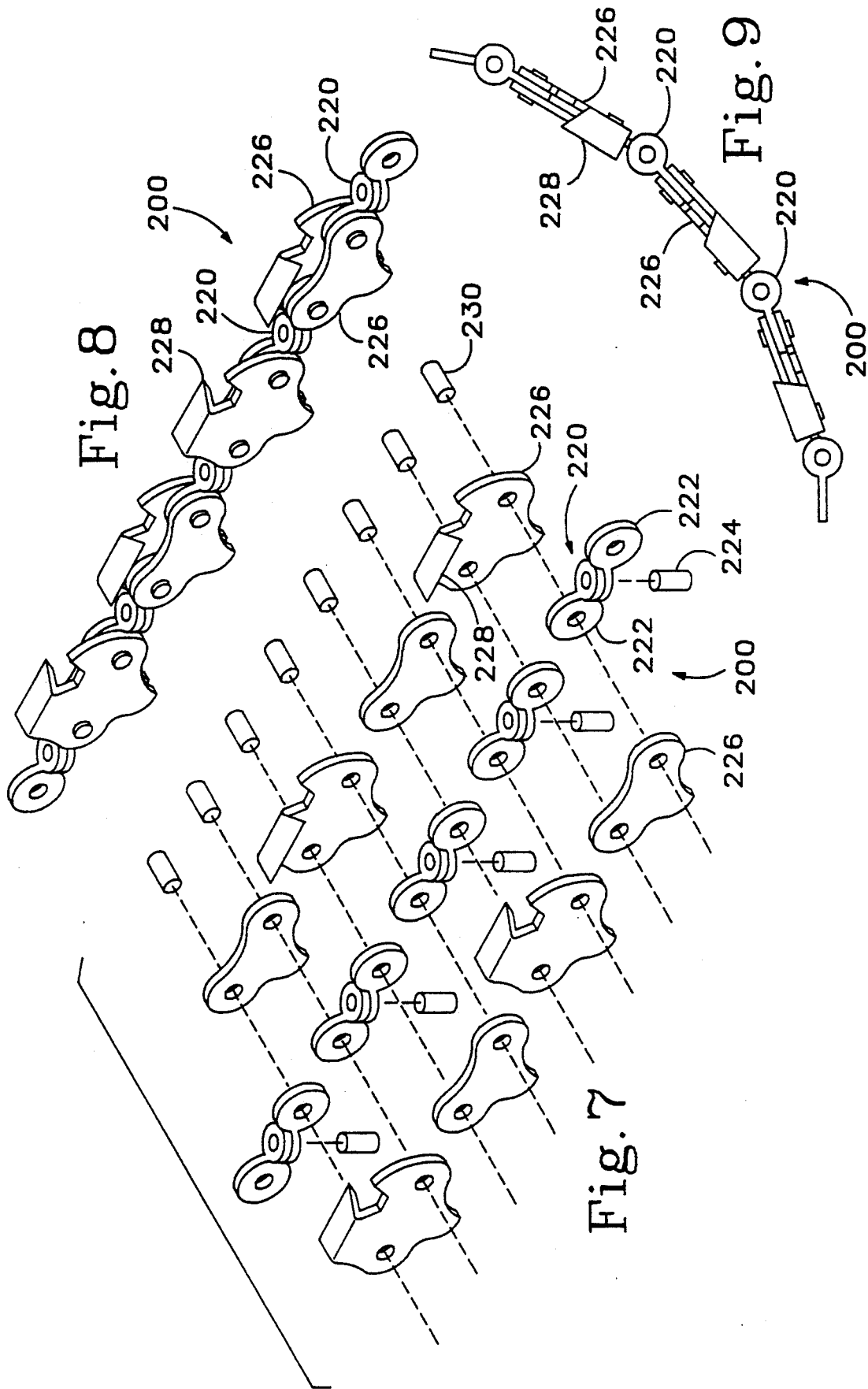

PRUNING APPARATUS HAVING A HELICAL CUTTING HEAD

BACKGROUND OF THE INVENTION

Field of the Invention

The present invention pertains to tree pruning apparatuses for pruning limbs from standing trees, and particularly to such an apparatus incorporating a chain saw.

Description of the Related Art

Two related arts are relevant to the background of the present invention: tree pruners and chain saws. Tree pruners are disclosed in Vaders, U.S. Pat. No. 4,781,228 and Egge, German Patent 3702760. Vaders discloses a tree pruning device mounted on a tractor-like vehicle. The tree pruning device has four separate chains attached to arms which can move to encircle a tree trunk which causes the chains to encircle the tree trunk. The chains are provided with sharp, blade-like edges. The apparatus then forces the device up along the tree trunk, so that when the chain is rammed against a tree limb, the limb is chopped off the trunk. The tree pruner disclosed in Vaders is large, expensive and its use is likely to injure the bark of the tree. Accordingly, it may be suitable for preparing trees prior to felling them, but it is not suitable for pruning trees as part of a forest management program when it is intended to leave the tree for future growth.

Egge likewise discloses a pruning apparatus having a lopping attachment that is hydraulically driven up the trunk of a tree. The top edge of the lopping attachment is sharpened into a blade-like surface so that limbs are severed from the tree trunk as the lopping attachment moves up the tree trunk. The pruning apparatus in Egge will severely injure the bark of the tree and is therefore not suitable for pruning trees as part of a forest maintenance program.

Other patents disclose apparatuses for delimbing felled trees: McCollum, U.S. Pat. No. 2,948,311 and Loigerot, U.S. Pat. No. 3,967,663. McCollum uses a pair of endless cutting chains attached to mechanical arms for wrapping the chains around a tree trunk. The apparatus in McCollum is large and expensive and is intended for use in tree harvesting. Thus, it is not suitable for use in pruning trees as part of a forest maintenance program because the chains rub directly against the trunk of the tree and will injure the bark.

Loigerot discloses a cutting chain formed from a plurality of articulated links wherein the links are shaped as parallelograms and are attached to adjacent links in an offset manner so that when the chain is wrapped around a cylindrical object, such as a tree trunk, it is helical. Each link carries a knife member along an edge for lopping branches off felled trees. Loigerot discloses a common difficulty encountered in pruning trees: tree limbs do not grow at random heights along the tree, rather, a plurality of limbs will grow at a discrete height as in a ring around the trunk. The cutting chain in Loigerot employs the helical chain configuration so that the cutting surface encounters the ring of limbs at an angle thereby severing the limbs individually rather than trying to lop off all of the limbs simultaneously, which would require greater force. Although configured in a helical pattern, it is important that the chain in Loigerot can only curve in one direction. Therefore, the cutting chain in Loigerot cannot be adapted to a system wherein the chain is driven by a motor for cutting the limbs because the chain cannot curve in a manner to double back on itself so as to become an endless chain. Furthermore, the delimbing apparatus disclosed in Loigerot is suitable for delimbing only felled trees.

Prior art chain saws have a rigid chainbar with a guide track for an endless cutting chain that is driven by an engine or motor attached to the chainbar. The chains have articulated links so that the chain can curve about one lateral axis to form an endless chain and so that it may follow the track in the chainbar. Prior art chains employ a single row of drive links sandwiched between two outer rows of side plates, and teeth are formed on the side plates for cutting wood. Prior art chainbars are planar, elongate, and rigid; as such they are incapable of bending around a curve. In order to cut branches from a standing tree with a prior art chain saw it is necessary to cut branches on separate sides of the tree trunk in a series of passes. Because of this limitation, prior art chain saws have not been adopted for automatic pruning apparatuses for pruning branches from a standing tree.

Prior art saw chains are disclosed in Cleva, U.S. Pat. No. 4,218,820 and Perez, U.S. Pat. No. 4,619,172. Cleva discloses a saw chain for connecting to rope or cable so that it may be thrown over a high limb and the opposite ends manually pulled back and forth to saw through a tree limb. The chain in Cleva is articulated so that the chain can curve about only one lateral axis. Likewise, Perez discloses a chain that is articulated, but which can curve about only one lateral axis.

SUMMARY OF THE INVENTION

The present invention provides a pruning apparatus for pruning limbs from a standing tree using a chain saw that has a flexible chainbar and a double-articulated cutting chain. The pruning apparatus has a power source on a mobile cart and the chain saw is supported by a cart-mounted support wand.

The chain saw has a flexible chainbar that supports the endless, double-articulated cutting chain. The chainbar is made of spring steel and formed into a helix shape. The chain has a row of articulated tie straps sandwiched between two rows of drive links which are articulately connected to the tie straps. Thus, because the chain is double-articulated it can be endless and curve about two lateral axes so that it may follow the helical shape of the chainbar while it is wrapped around a tree trunk. Because the chain is driven, and therefore saws (as opposed to chopping) the present invention is able to cut much larger limbs from standing trees with a smaller, lighter weight power source than was possible with prior art devices. Furthermore, because the chainbar is helical it can wrap entirely around a tree trunk so that one pass of the pruning apparatus cuts limbs from the entire tree trunk. Furthermore, the helical shape of the cutting bar permits cutting equal-height limbs sequentially rather than simultaneously, making it easier for the chain to cut through a ring of limbs.

It is an objective of the present invention to provide a pruning apparatus that prunes limbs from a standing tree without injury to the bark.

It is an objective of the present invention to provide a chain saw having a flexible chainbar for circumflexing the trunk of a standing tree for pruning limbs from the tree.

It is an objective of the present invention to provide a double-articulated cutting chain, which can follow a perimeter of a helical chainbar while driven by a power source, for cutting limbs from a tree trunk.

It is an objective of the present invention to provide a lightweight pruning apparatus that can be positioned around a tree trunk high above the ground and powered by a remote power source for pruning limbs from a standing tree while the operator stands safely on the ground.

The foregoing and other objectives, features, and advantages of the invention will be more readily understood upon consideration of the following detailed description of the invention, taken in conjunction with the accompanying drawings.

BRIEF DESCRIPTION OF THE FIGURES

FIG. 2 is a side elevation view of the chain saw shown in FIG. 1 circumflexed a tree trunk and connected to a support vehicle.

FIG. 3 is a perspective view of the chain saw of FIG. 1 held in a planar configuration by a bowstring which is pulled taut and secured by a trigger.

FIG. 4 is a cross-section view taken along line 4—4 in FIG. 3.

FIG. 5 is a cross-section view taken along line 5—5 in FIG. 3.

FIG. 6 is a detail view of a trigger.

FIG. 7 is an exploded view of a double-articulated cutting chain of the present invention.

FIG. 8 is a perspective view of the double-articulated chain of FIG. 7.

FIG. 9 is a top view of the double-articulated cutting chain of FIG. 7.

DETAILED DESCRIPTION OF A PREFERRED EMBODIMENT

Figure 1:
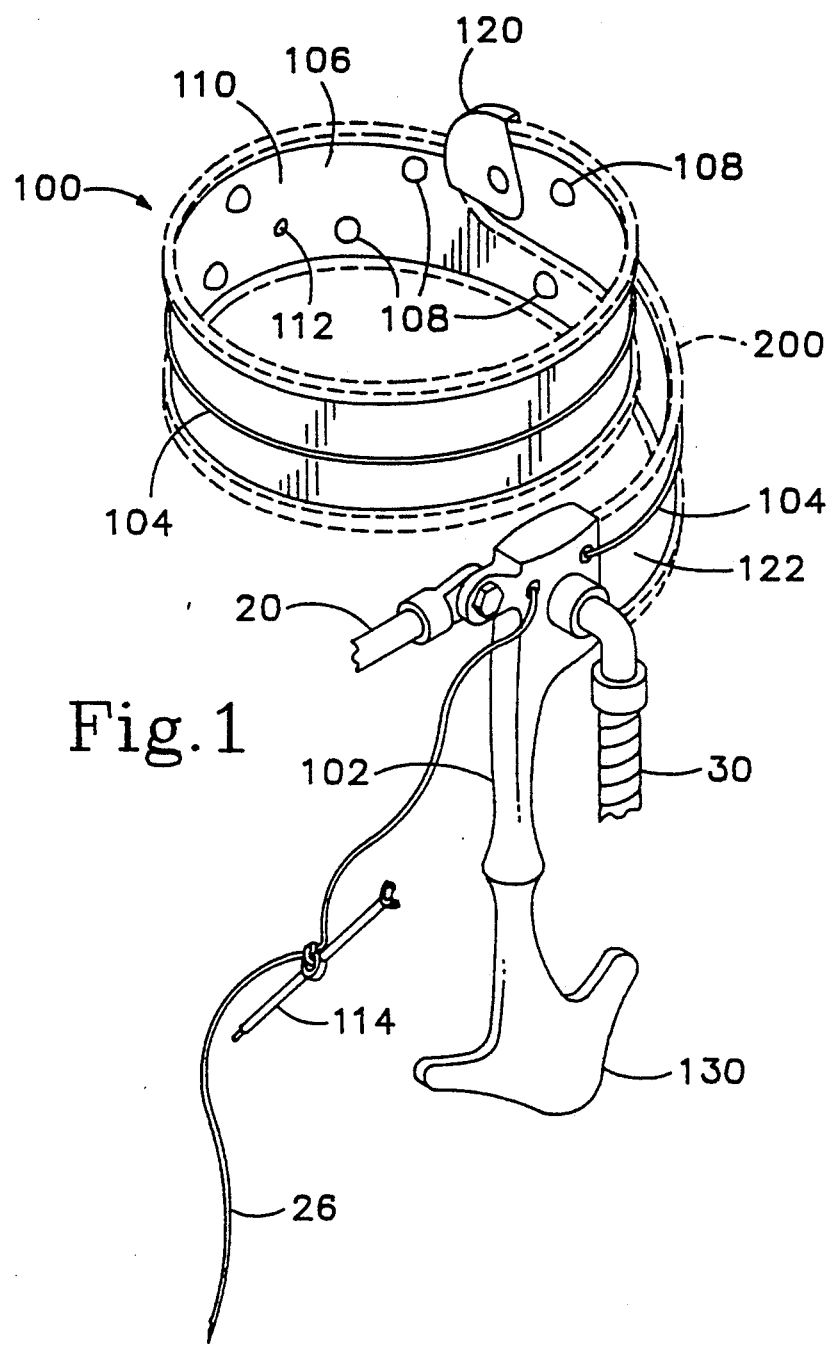
FIG. 1 is a perspective view of a preferred embodiment of a chain saw of the present invention.

With reference to the Figures, a preferred embodiment of the present invention will now be described. Referring to FIG. 2, there is shown a pruning apparatus 10 engaging a tree trunk 12 for the purpose of pruning limbs 14 from the trunk. In general, an operator (not shown) will position a chain saw 100 around the tree trunk 12. The chain saw 100 is supported on a semi-rigid support wand 20 which is connected to a cart 22 for mobility. A power supply 24 sits on the cart 22 and remotely provides power to the chain saw 100 via a power transfer mechanism 30. A lanyard 26 is also provided; the purpose of which will become apparent in the description below.

The cart 22 and power supply 24 are common to many prior art apparatuses. Accordingly, specific details regarding these elements are not provided because anyone familiar with the art of pruning apparatuses would be able to configure a suitable cart and power supply. However, some features of these elements are specific to the present invention and are generally described below.

The cart 22 is constructed of a durable frame 28 and is provided with large diameter wheels so that the cart may be pushed over uneven forest terrain. The preferred embodiment of the cart 22 provides two wheels on a common axle and a support stand (not shown) to support the cart so that it may be self-standing. Other embodiments of the cart could have a different number of wheels in a different configuration. Alternatively, a tractor or other piece of heavy equipment could carry the chain saw 100, support wand 20, and power supply 24. Also, another embodiment of the invention could use a backpack mounted power supply and the support wand 20 could be hand held by an operator.

In a preferred embodiment the power supply 24 is a gasoline powered engine which transmits power to the chain saw 100 by a flexible shaft as the power transfer mechanism 30. Alternatively, the power supply 24 may be a gas powered generator for generating electricity to drive an electric powered chain saw 100. In the case of an electric generator power supply 24, the power transfer mechanism 30 would be an electrical wire.

The support wand 20 has a preferred embodiment as a semi-rigid pole that is stiff enough to support the weight of the chain saw 100, yet flexible to accommodate some jerky motion of the chain saw and absorb vibration. Alternatively, the support wand 20 could comprise a stiff rod hingedly connected to the chain saw at one end and to the power cart 22 at its other end. Another embodiment of the support wand could comprise a plurality of articulated linkages such as those employed in a scissors jack. Yet another embodiment of the support wand 20 could comprise a telescoping rod. All of the various embodiments of the support wand could benefit from the use of electric motors or hydraulic actuators for positioning the wand and chain saw.

With reference to FIGS. 1 and 3-6, a preferred embodiment of the chain saw 100 will now be described. The chain saw has a doghead 102 which provides a connection for the support wand 20 and is connected to the power transfer mechanism 30 for receiving power from the power supply 24. The doghead 102 is also connected to a flexible chainbar 106 which supports a cutting chain 200. The doghead also has connections for a bowstring 104 and the lanyard 26.

In the case of the preferred embodiment employing a gas engine power supply 24 and the flexible shaft power-transfer mechanism 30, the doghead 102 incorporates a drive sprocket which drives the cutting chain 200. Supplying power to a drive sprocket which in turn drives a cutting chain is familiar technology to those skilled in the art and is not here disclosed. Alternatively, in the case of the electric generator used as the power supply 24 and the wire power-transfer mechanism 30, the doghead 102 contains an electric motor for driving a drive sprocket which in turn drives the cutting chain 200. As above, the technology of providing an electric motor which runs a drive sprocket which in turn runs a cutting chain is familiar technology to those skilled in the art and does not comprise the claimed invention and is not disclosed in detail herein.

The chainbar 106 is preferably a high grade spring steel that is preformed into the shape of a helix. The cutting chain 200 straddles the chainbar, as best seen in FIGS. 4 and 5. The chainbar 106 has a plurality of standoffs 108 along an inside surface 110 for maintaining a predetermined distance between the chainbar and the tree trunk 12. The standoff 108 size may be adjusted by an adjustment screw (not shown) or by replacement with alternative sizes. The chainbar also has a hole 112 for receiving a trigger 114 which purpose will be described below in regard to the operation of the chain saw 100 below. The chainbar 106 also supports a sprocket 116 at its distal end 120 for ensuring smooth running of the cutting chain 200. A tip guard 118 guards against the effects of kickback and protects the sprocket 116. Oil is delivered to the sprocket 116 via an oil duct 121 that is located within the bowstring 104.

The chainbar 106 is preformed in the shape of a helix for several reasons. The chainbar is designed to wrap around the trunk of a tree so that limbs may be pruned completely around the tree trunk by one pass of the chain saw. The helical pattern of the chainbar also permits the distal end 120 to overlap a proximal end 122 so that the chainbar can wrap all the way around a tree trunk without having the distal end 120 hitting the other end which could cause substantial damage when the cutting chain is moving at high speed. Another advantage to the helical shape is efficiency of cutting when the chain saw encounters numerous branches occurring at the same height along the tree trunk. If the chainbar were annular, the cutting chain would encounter branches at the same height simultaneously. However, the helical shape permits the lower end (e.g., the proximal end 122) to encounter and cut branches before higher portions of the chainbar contact and cut branches on another side of the tree. This reduces the cutting load on the chain permitting the use of smaller, lighter power sources.

A preferred method of operation of the chain saw of the present invention will now be described with particular reference to FIGS. 2-6. With the chain saw 100 lowered to ground level, and the operator standing on the ground, the operator will first ensure that the power supply is off. Next, the operator will flex the spring steel chainbar 106 to make it substantially planar, as it appears in FIG. 3. While holding the chainbar 106, the operator will insert a tenon 124 of the trigger 114 into the hole 112. The operator will then route the bowstring 104 over the trigger's head 126 where it will nestle into a notch 128. The operator can then release the chainbar 106 and it will remain in a substantially planar configuration, held in place by the tension in the bowstring 104. The operator will then release the chain saw 100 and take control of the support wand 20 to raise the chain saw upward into a tree between branches and next to the trunk 12. After the operator has satisfactorily positioned the chain saw 100, the operator will pull on the lanyard 26 thereby pulling the trigger 114 out of the hole 112, releasing the tension on the bowstring 104 allowing the chainbar 106 to resume its natural helical configuration, thereby circumflexing the tree trunk 12. The standoffs 108 position the chainbar and cutting chain 200 away from the tree trunk so that the cutting operation will not dig into the trunk or injure the bark of the tree. The operator would then start the power supply, engage the power transfer mechanism 30 to run the cutting chain 200, and operate the support wand and cart position to lower the chain saw down the length of the tree trunk thereby cutting limbs from the trunk. A dog 130, attached to the doghead 102, is weighted and shaped to assist in lowering the chain saw down the trunk and in maintaining a proper orientation.

Figure 12:
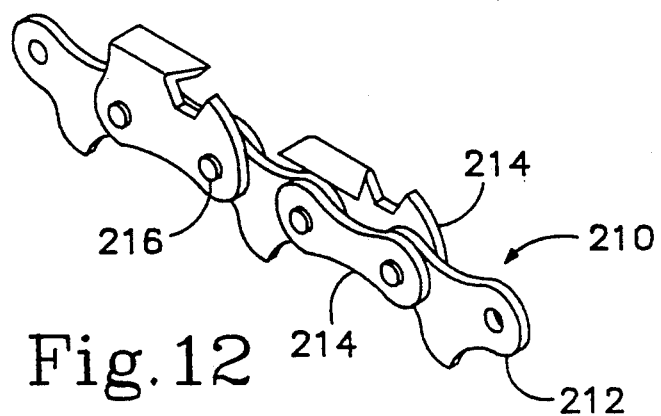
FIG. 12 is a perspective view of a prior art cutting chain.

Prior art chains are able to curve about a single lateral axis in order to be joined into an endless chain and to follow a prior art rigid chainbar. FIG. 12 shows a prior art chain 210 having drive links 212 connected to side plates 214 by press fitted pins 216. Because the side plates 214 and the drive links 212 are rotatable about the pins 216, the combination forms an articulated chain that can curve about one axis only, which axis is orthogonal to the planar surface of the side plates 214 and drive links 212.

The present invention provides an articulated cutting chain that can curve about two orthogonal, lateral axes. Defining the length of the chain as a longitudinal axis, then all axes orthogonal to that longitudinal axis are lateral axes. E.g., relating the definition to a Cartesian coordinate system: the longitudinal axis would relate to the X axis and all axes in the Y-Z plane are lateral axes.

The chain 200 comprises a plurality of tie straps 220 each of which has two articulated eyelets 222 which pivot about a first lateral axis defined by a pin 224. There are also two rows of drive links 226 that are articulately connected to pairs of tie straps 220 by press fitted pins 230 to form an articulated connection for rotation about a second lateral axis. Alternate drive links in each row have teeth 228 for cutting. Thus, the combination of the articulated tie straps 220 articulately connected to the drive links 226 enables the cutting chain 200 to curve about two orthogonal, lateral axes.

Figure 10:
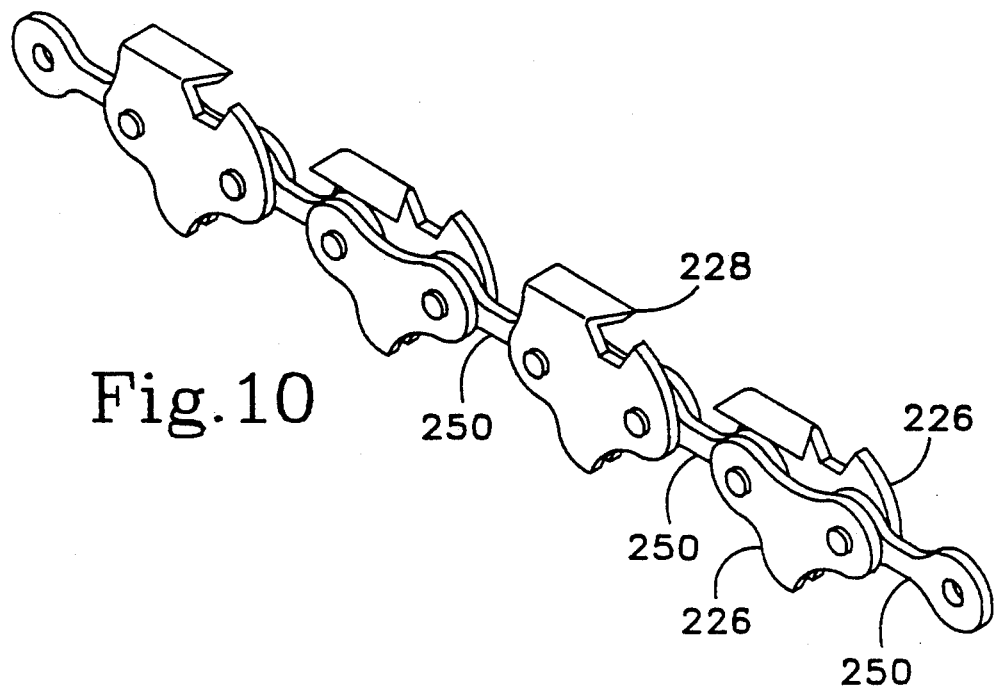
FIG. 10 is a perspective view of an alternative embodiment of a double-articulated chain of the present invention.
Figure 11:
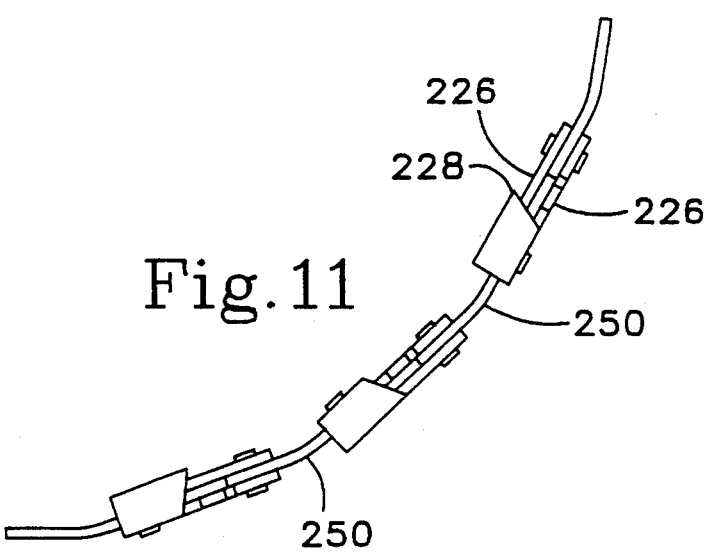
FIG. 11 is a top view of the double-articulated chain of FIG. 10.

An alternative embodiment of the double-articulated cutting chain 200, shown in FIGS. 10 and 11, may use flexible tie straps 250 instead of the articulated tie straps 220. In this embodiment, the flexibility of the tie straps 250 would permit the chain to curve about the first lateral axis. The flexible tie strap would be articulately connected to the outside rows of drive links 226, which articulate connection would permit the chain 200 to curve about the second lateral axis. Because the flexible tie straps may twist (in addition to curving), it may be that the first and second lateral axes of curvature of the chain are not orthogonal when flexible tie straps are used.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A pruning apparatus, comprising:
   (a) an elongate, double-articulated cutting chain curvable about a first lateral axis and a second lateral axis;
   (b) a chainbar that is flexible about said first lateral axis for carrying said cutting chain; and
   (c) a power source for driving said cutting chain on said chainbar for cutting limbs from trees.

2. The pruning apparatus of claim 1 wherein said first lateral direction is orthogonal to said second lateral direction.

3. The pruning apparatus of claim 1 wherein said chainbar has a relaxed state in the form of a helix.

4. The pruning apparatus of claim 1 wherein said cutting chain comprises a first row of drive links, a second row of drive links, and a row of tie straps located between said first row and second row of drive links, said tie straps articulately connected to said drive links for curving said chain about said second lateral direction.

5. The pruning apparatus of claim 4 wherein said cutting chain straddles said chainbar by having portions of said first row of drive links and said second row of drive links on different sides of said chainbar.

6. The pruning apparatus of claim 1 wherein said cutting chain comprises a first row of drive links, a second row of drive links, and a row of tie straps located between said first row and second row of drive links, each said tie strap having a first eyelet and a second eyelet that are articulately connected to one another for curving said chain about said first lateral direction.

7. The pruning apparatus of claim 1 wherein said cutting chain comprises a first row of drive links, a second row of drive links, and a row of flexible tie straps located between said first row and second row of drive links, said tie straps being flexible for bending said chain about said first lateral direction.

8. The pruning apparatus of claim 1 further comprising a support wand for raising said chainbar and said cutting chain into a tree.

9. The pruning apparatus of claim 8 further comprising a power transfer means for driving said chain by said power source remotely.

10. The pruning apparatus of claim 1 further comprising a bowstring interconnected to each end of said chainbar and a trigger selectively mountable between said chainbar and said bowstring for maintaining said chainbar substantially planar shape, wherein said trigger may be removed so that said chainbar can flex into a helical shape thereby wrapping itself around a tree or similar object.

11. A pruning apparatus, comprising:
 (a) an articulated cutting chain having a plurality of cutting teeth;
 (b) a flexible, helical-shaped chainbar for carrying said cutting chain;
 (c) a doghead for carrying said chainbar; and
 (d) a power source for driving said cutting chain so that said chain can perform pruning operations.

12. The pruning apparatus of claim 11 wherein said chain comprises a first row of drive links, a second row of drive links, and a row of articulated tie straps located between said first row and second row of drive links, said tie straps being further articulately connected to said drive links.

13. The pruning apparatus of claim 11 wherein said chain comprises a first row of drive links, a second row of drive links, and a row of flexible tie straps located between said first row and second row of drive links, said tie straps further articulately connected to said drive links.

14. The pruning apparatus of claim 11 wherein said power source is remotely located and further comprising a power transfer means for transferring power from said power source to said doghead, wherein said doghead further comprises means for receiving said power from said power transfer means and driving said chain.

15. The pruning apparatus of claim 11 further including a dog interconnected with said doghead for guiding said doghead along a tree trunk.

16. The pruning apparatus of claim 11 wherein said chainbar further comprises a plurality of fixedly attached standoffs that define a minimum distance between said chainbar and a tree trunk when said chainbar is wrapped around the tree trunk.

17. The pruning apparatus of claim 11 further comprising a bowstring connected to each end of said chainbar and a trigger selectively mountable between said chainbar and said bowstring for maintaining said chainbar in a nonhelical form, wherein said trigger may be removed so that said chainbar can flex into a helical shape thereby wrapping itself around a tree or similar object.

* * * * *